United States Patent [19]
Rohoza

[11] Patent Number: 5,634,294
[45] Date of Patent: Jun. 3, 1997

[54] METHOD OF ENHANCING THE GROWTH OF PLANTS

[76] Inventor: Alex Rohoza, 2250 Big Sewickley Creek Rd., Sewickley, Pa. 15143

[21] Appl. No.: 465,678

[22] Filed: Jun. 6, 1995

Related U.S. Application Data

[63] Continuation-in-part of Ser. No. 339,654, Nov. 15, 1994, which is a continuation of Ser. No. 116,137, Sep. 2, 1993, abandoned, which is a continuation-in-part of Ser. No. 943,879, Sep. 11, 1992, abandoned, which is a continuation-in-part of Ser. No. 789,720, Nov. 8, 1991, abandoned.

[51] Int. Cl.⁶ .................. A01B 79/00; A01C 1/00
[52] U.S. Cl. .................................. 47/58; 47/1.01
[58] Field of Search .............. 47/1 F, 1.01, 58.25

[56] References Cited

U.S. PATENT DOCUMENTS

| | | | |
|---|---|---|---|
| 1,247,166 | 11/1917 | Steelquist | 47/38 |
| 1,442,367 | 1/1923 | Stevens | |
| 1,858,330 | 5/1932 | Horning | |
| 2,803,091 | 8/1957 | Radford | 47/38 |
| 2,850,843 | 9/1958 | Marbury | |
| 3,068,616 | 12/1962 | Shibata et al. | |
| 3,094,846 | 6/1963 | Peeler, Jr. | |
| 3,307,360 | 3/1967 | Bailly | |
| 3,479,825 | 11/1969 | Hellstrom | |
| 3,916,565 | 11/1975 | Ruyon | |
| 3,946,762 | 3/1976 | Green | 138/140 |
| 4,117,685 | 10/1978 | Skaife | 405/36 |
| 4,268,993 | 5/1981 | Cunningham | 47/62 |
| 4,348,135 | 9/1982 | St. Clair | |
| 4,538,377 | 9/1985 | Thornton | |
| 4,576,511 | 3/1986 | Vidal, Jr. | 405/37 |
| 4,812,339 | 3/1989 | Shibata et al. | 428/15 |
| 4,917,535 | 4/1990 | Prassas | |
| 5,074,708 | 12/1991 | McCann, Sr. | |
| 5,156,741 | 10/1992 | Morrison et al. | 47/1 F |
| 5,219,243 | 6/1993 | McCoy | 405/36 |
| 5,282,873 | 2/1994 | Watari | 47/1 F |
| 5,306,317 | 4/1994 | Yoshizaki | 47/1 F |

FOREIGN PATENT DOCUMENTS

| | | |
|---|---|---|
| 8900298 | 9/1990 | Netherlands |
| 1049614 | 10/1983 | U.S.S.R. |
| 1748700 | 7/1992 | U.S.S.R. |
| 1453883 | 10/1976 | United Kingdom |
| 1514808 | 6/1978 | United Kingdom |
| 9204823 | 4/1992 | WIPO |

OTHER PUBLICATIONS

Rich Skyzinski, *Little Course Goes High–Tech*, Golf Journal, Jun. 1995.

*Primary Examiner*—Terry Lee Melius
*Assistant Examiner*—Joanne C. Downs
*Attorney, Agent, or Firm*—Kirkpatrick & Lockhart LLP

[57] ABSTRACT

A method for enhancing the growth of plants in a growing medium that covers a profile. The method comprises the steps of coupling a blower to a network of pipes in the profile and continuously injecting air under pressure therein. The method may include calculating the pore space in the profile and injecting air under pressure into the network of pipes for at least the predetermined time period necessary to fill the pore space. The method may also include pre-cooling the air before it is injected into the network of pipes.

4 Claims, 5 Drawing Sheets

5,634,294

METHOD OF ENHANCING THE GROWTH OF PLANTS

BACKGROUND OF THE INVENTION

This is a continuation-in-part application of U.S. patent application Ser. No. 08/339,654, filed Nov. 15, 1994, presently which is a continuation of U.S. patent application Ser. No. 08/116,137, filed Sep. 2, 1993, now abandoned, which was a continuation-in-part of U.S. patent application Ser. No. 07/943,879, filed Sep. 11, 1992, now abandoned, which was a continuation-in-part of Ser. No. 07/789,720, filed Nov. 8, 1991, now abandoned, which was also the parent of continuation U.S. patent application Ser. No. 08/057,209 filed May 3, 1993, now abandoned.

FIELD OF THE INVENTION

The present invention relates to methods for growing plants and, more particularly, to a method for growing and maintaining bent grass used on golf greens.

DESCRIPTION OF THE BACKGROUND OF THE INVENTION

Golf course greens, including those used on courses affiliated with the United States Golf Association ("USGA"), are typically constructed using gravel, sand, soil, humus and either seed or sod. A typical construction may consist of a substratum that is laid upon a compacted base of virgin soil covered by a layer of a modified soil mixture and a layer of sand. The modified soil mixture may typically include sand, humus, and natural soil. Sod, which may be grown in sand for use as a golf course green, is then placed on top of the sand layer. While the typical sizes of the layers may vary, it is hoped that the roots of the grass plants which comprise the sod would grow down through the sand layer and ultimately anchor themselves in the modified soil layer.

Constructing a green in this manner requires that a drainage system be installed beneath the surface of the green in order to drain and carry away excess water. Typically, corrugated pipe is placed on the base prior to the layer of modified soil being placed thereon. A generally rectangular pattern of corrugated pipes is typically installed such that a plan view of the layout of such pipes would resemble a checkerboard or herringbone pattern. For the corrugated pipe to be effective as a drain, the pipes must have an elevational fall thereby allowing excess water to flow in a direction away from the green. A green constructed in this manner will be referred to as a "USGA" green for the purposes of this application.

There are many problems arising with both the grass plants themselves and with the drainage systems as a result of the manner in which greens are constructed today. By their very nature, golf course greens are constantly being compacted during use, placing a tremendous amount of stress on the root structure of the individual grass plants. It is known that the longevity and playability of a green is a function of the strength and durability of the root structure of those grass plants and the ability of that root structure to store moisture and nutrients. This is particularly true during the stressful months of July and August in the United States where many areas of the country have high temperatures and little rainfall. Under such heavy stress conditions, even with proper moisture and nutrients, the root structure of grass plants tends to deteriorate. This is believed to be due to the lack of soil pore space that facilitates the passage of oxygen to the root structure and to prevent trapped water from stagnating.

Still other problems arise when employing existing drainage systems of the type described above. While greens have been constructed with such drainage systems for many years, there are many inherent problems with that type of construction. As the drainage system is designed only to carry away excess moisture from the green, such a drainage system does not function to supply water to the green should the moisture level of the green be below normal levels. Thus, a significant amount of watering is required to maintain an adequate moisture level. This creates a wasteful and inefficient watering cycle wherein the green is first saturated with water and then the excess water is drained from the green. Water is simply carried away and not redistributed. Additionally, in order to function as an effective drain, the corrugated pipes must be laid in a pattern such that water may flow downward with the elevation or grade of the land. This often results in expensive subsurface preparation simply to install the necessary drains.

The present invention is directed toward improved care techniques for growing plants which overcomes, among others, the above-discussed problems and provides for the effective, efficient provision of air, water and other fluids to the root systems of plants.

SUMMARY OF THE INVENTION

In accordance with particular preferred forms of the present invention, there are provided methods for enhancing the growth of plants in a growing medium that covers a substratum (also known as "profile") that has a predetermined porosity. One preferred method includes the steps of coupling means for supplying air to the profile and continuously blowing air into the profile. Another preferred method includes the steps of coupling means for supplying air at a predetermined rate into the profile, calculating the pore space of the profile, and blowing air into the profile for at least the predetermined time period necessary to substantially fill the pore space of the profile.

It is an object of the present invention to provide a method which enhances plant growth while controlling air flow to the plants which provides air/oxygen to plant roots.

Accordingly, the present invention overcomes many of the problems associated with present profile systems. The greens which are grown on the profile are thereby heartier, more playable, and more durable. These and other advantages and benefits of the present invention will become apparent from the Detailed Description of the Preferred Embodiment hereinbelow.

BRIEF DESCRIPTION OF THE DRAWINGS

For the present invention to be clearly understood and readily practiced, a preferred embodiment will now be described, by way of example only, wherein.

DETAILED DESCRIPTION OF PREFERRED EMBODIMENTS

Figure 1:
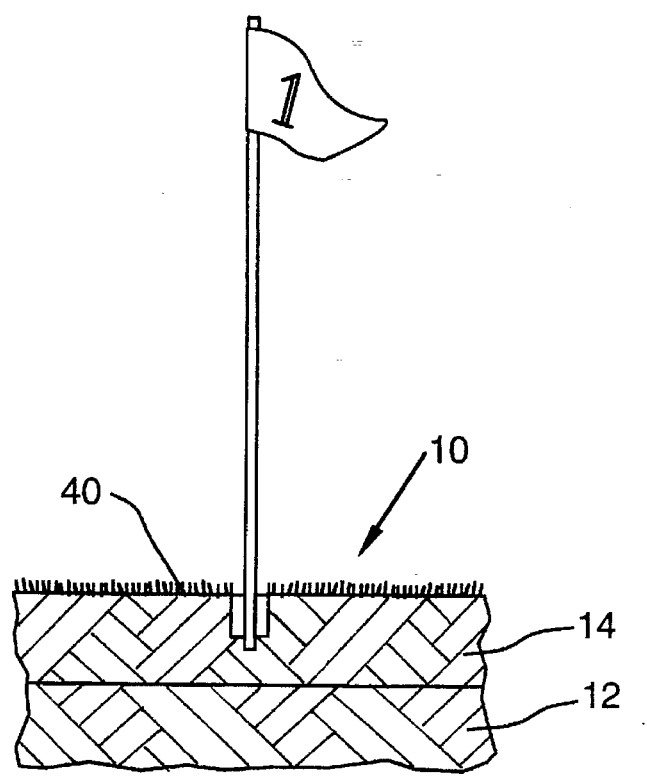
FIG. 1 is a cross-sectional view of a golf course green beneath which the present invention may be constructed.

Referring now to FIG. 1, there is shown a golf course green, generally referred to by the numeral 10, comprising a base soil 12, a substratum or profile 14 and a turf layer or grass 40. While the present invention will be described in the context of a golf course green 10, such an application is for illustrative purposes only and is not intended to limit the invention to such application. Other applications contemplated by the present invention may include, for example, athletic fields, public parks, and nurseries. Indeed, as will be appreciated by those in the art from this disclosure, certain embodiments of the present invention may be advantageously used in the growing of virtually any surface and, perhaps, some subterranean plants.

Figure 2:
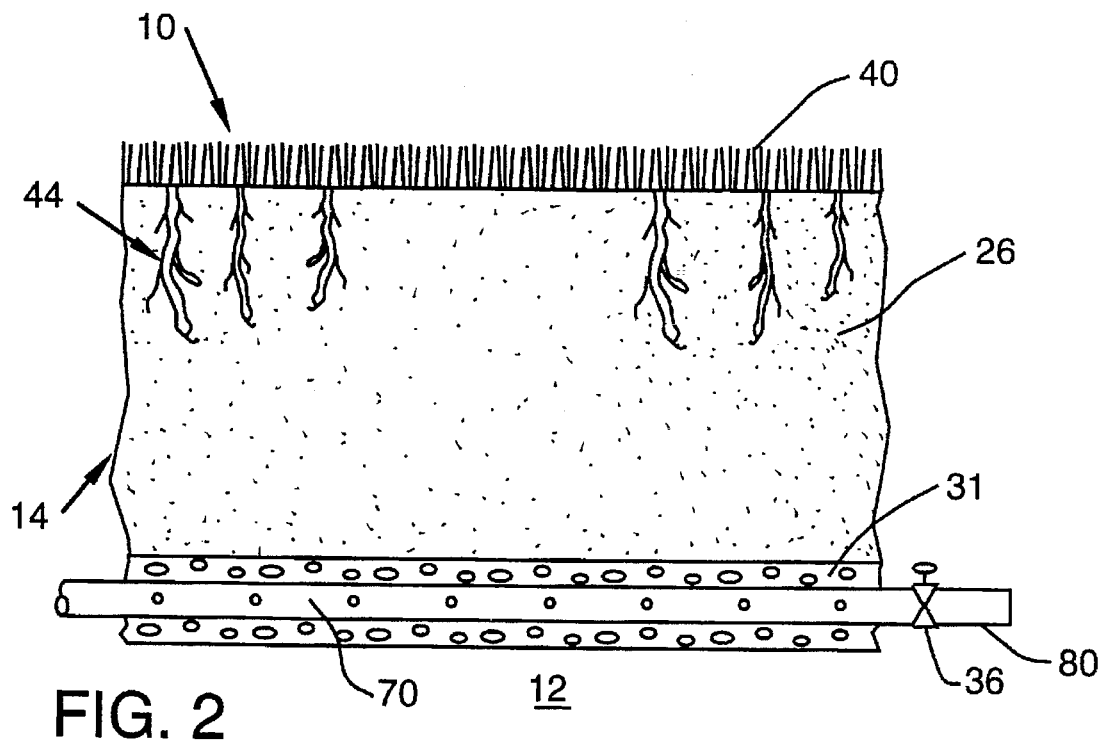
FIG. 2 is a cross-sectional view of a green constructed according to the USGA method but with a valve attached to the subterranean pipes to control air admission to the system while another valve may drain excessive water therefrom.

More particularly and with reference to FIG. 2, there is shown a cross-sectional view of base soil 12 supporting a profile 14 thereon. The base soil 12 is that surface on which the profile according to this invention are constructed and generally comprises the original ground or, as used herein, "natural soil" which has been excavated to a desired depth below the ultimate surface of the green, although for some applications, it may be desirable to place a layer of modified soil mixture on top of the natural soil or, perhaps, to allow the natural soil to remain undisturbed. Alternatively, the base soil 12 may comprise the upper surface resulting from the complete or partial excavation of, for example, a prior golf course green which is to be reconstructed. The modified soil mixture, if used, is typically a mixture of sand, humus, and soil. It is preferred that the base soil 12 be excavated such that the top of the base soil 12 is at a depth of approximately twelve to fifteen inches from the top of the grass 40 of the green 10, but such depth may vary depending on the particular design and implementation of the layers which form the profile 14.

Figure 5:
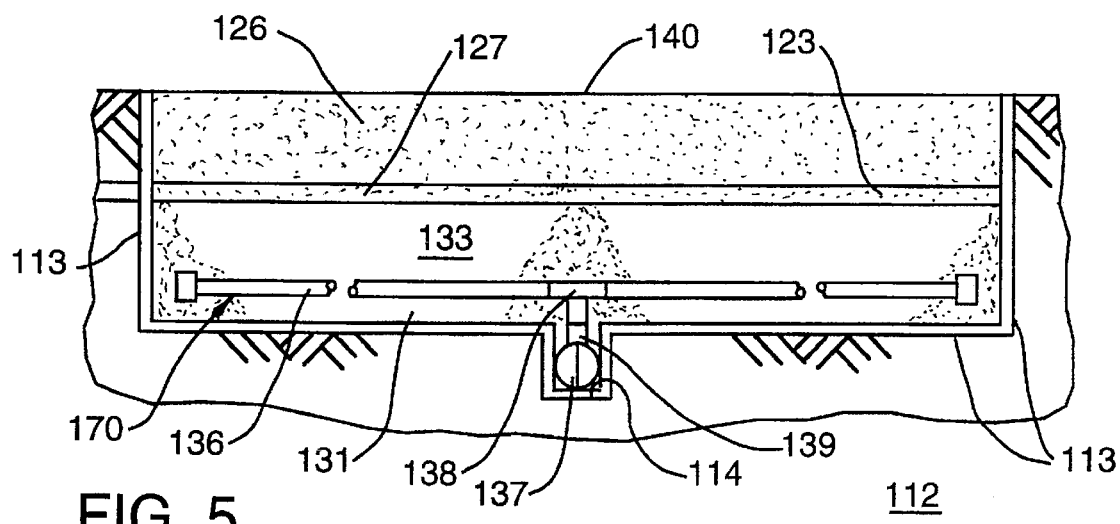
FIG. 5 is a cross-sectional view of a green constructed according to an alternative embodiment wherein an impervious barrier forms a base upon which the profile is constructed.

A network of subterranean pipes, shown as 70 in FIG. 2 or generally as 170 in FIG. 5, may, for example, be advantageously placed within or immediately beneath the growing medium for plants to form a conduit through which air may be distributed throughout a substantial portion of the profile 14, thereby forming a feeder system for the root structure, generally shown as 44. As described herein, such networks may include one or more pipes 70 or 170, respectively, wherein the relative positions of the pipes 70 or 170, respectively, in relation to the green 40 or 140 and the substratum 14 or 114, as the case may be, may vary depending on the application. It is preferred that such pipes 70 or 170 be constructed of twenty to forty gauge, one to four inch (2 to 10 cm) diameter PVC pipes. It is further preferred that the pipes 70, 170 have holes 72, 172, for example, holes of ⅛ to ½ inch diameter, evenly spaced along the length of the pipes 70, 170. The holes may, for example, be evenly spaced at intervals of 3 to 12 inches (8 to 30 cm). Alternatively, the holes may be positioned on top and bottom of the pipes 70, 170 and along each side of the pipes 70, 170.

Figure 3:
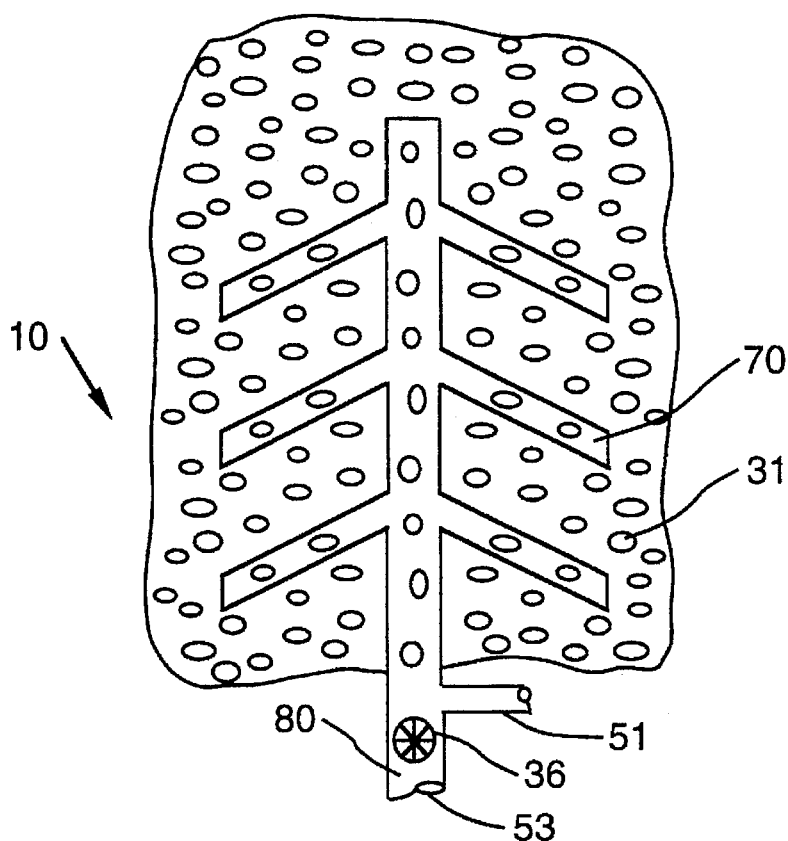
FIG. 3 is a top plan sectional view of a green constructed according to the USGA method but with a valve attached to the subterranean pipes.
Figure 4:
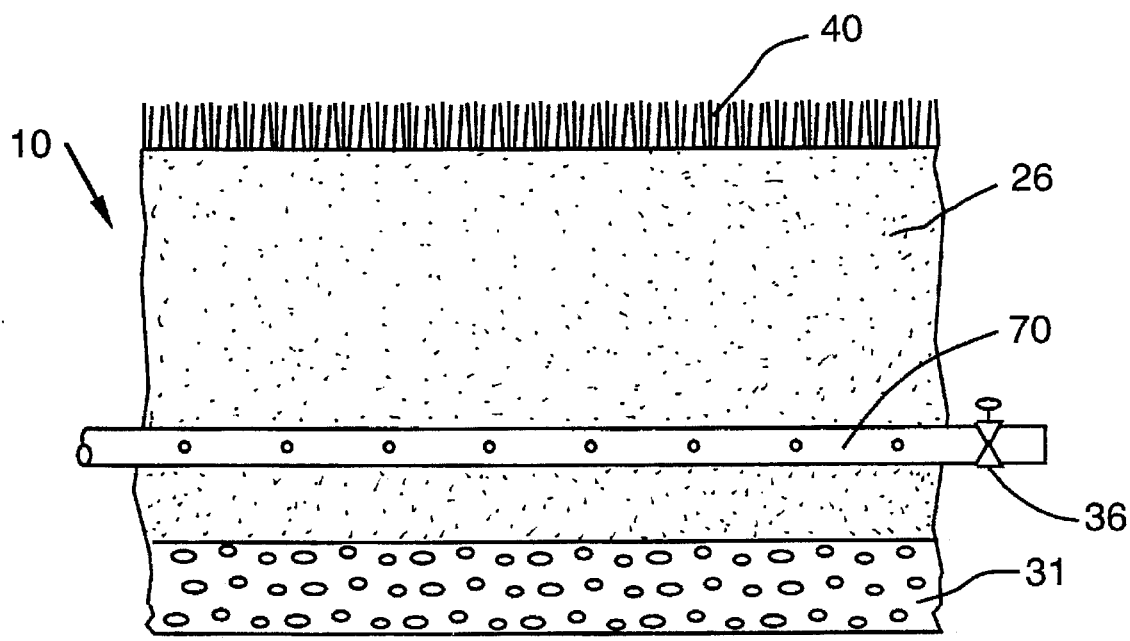
FIG. 4 is a cross-sectional view of a green constructed according to the USGA method but with a valve attached to the subterranean pipes wherein the pipes are positioned within the prepared soil profile.

As such, according to one embodiment of the invention, the drainage end 80 of the subterranean pipes 70 as found in a USGA green 10 (or pipes 170 as described above) may be connected to a valve 36 as shown in FIGS. 2 and 3 and to a connecting pipe 51. The drainage end 80 is the end of the subterranean pipes 70 which is remote from the center of the green. In many cases, it is preferable to have the drainage end 80 lower in elevation than any other ends of the subterranean pipes 70, so as to allow fluid to flow toward the drainage end 80 under the force of gravity. However air injected into the system when an exit valve is opened will boost drainage rapidly out of the system. The subterranean pipes 70 may be beneath the prepared soil profile 26 in a layer of gravel 31 or may be placed directly in the prepared soil profile 26 as shown in FIG. 4. Prepared soil, as used herein, means any porous growing medium, including any quartz materials sized for soil amending use and which conditions the soil and is actually used as a growing medium. Prepared soil is intended to encompass sand, soil which has been excavated and conditioned, a modified soil mixture of sand, soil, and humus, or any other type of suitable growing medium. By means of example only, sand will be used to describe the present invention. If sand is used, I prefer to use a silica sand or other sand that is USGA approved. The valve 36 may be, for example, a ball valve or any other type of valve capable of operating between an open and fully closed position as well as in positions therebetween. One end of the valve 36 is preferably connected adjacent to the free end of the subterranean pipes 70. The other end of the valve is preferably connected to an outlet pipe 53. When valve 36 is open, outlet pipe 53 may be used as a drain for carrying off excess water. Additionally, the connecting pipe 51 may be connected to a source (not shown) of air pressure. When the discharge valve is closed injected air will assist wick action of capillary water throughout the profile. This air movement throughout the system assists in ventilating toxic gases thus providing an aerobic soil environment. The source of air under pressure may, for example, be any type of commercial blower, such as a leaf blower, which may be coupled to the connecting pipe 51. The blower (not shown) preferably should be capable of moving two hundred (200) cubic feet of air per minute or more at a pressure similar to that of a commercial leaf blower.

Our results using a subterranean pipe system to introduce air in the root system as described above have exceeded our expectations. The introduction of air through such subterranean pipes 70 has the effect of raising the water table and moving moisture through the substrata 14 substantially uniformly while at the same time charging the growing medium with oxygen.

According to another embodiment of the invention and with reference to FIG. B, there is shown a cross-section of a substratum 110 for a golf course green 140. The base soil 112 may be prepared with a slight grade toward the center of the green 140, such grade may, for example, be approximately one (1) degree or more. A trough 114 cut into the base soil 112 extends longitudinally the length of the golf course green 140. While in this embodiment of the invention the network of pipes is referred to as numeral 170 in FIG. 5, specifically, a longitudinal pipe 137 is placed in the trough 114.

Figure 6:
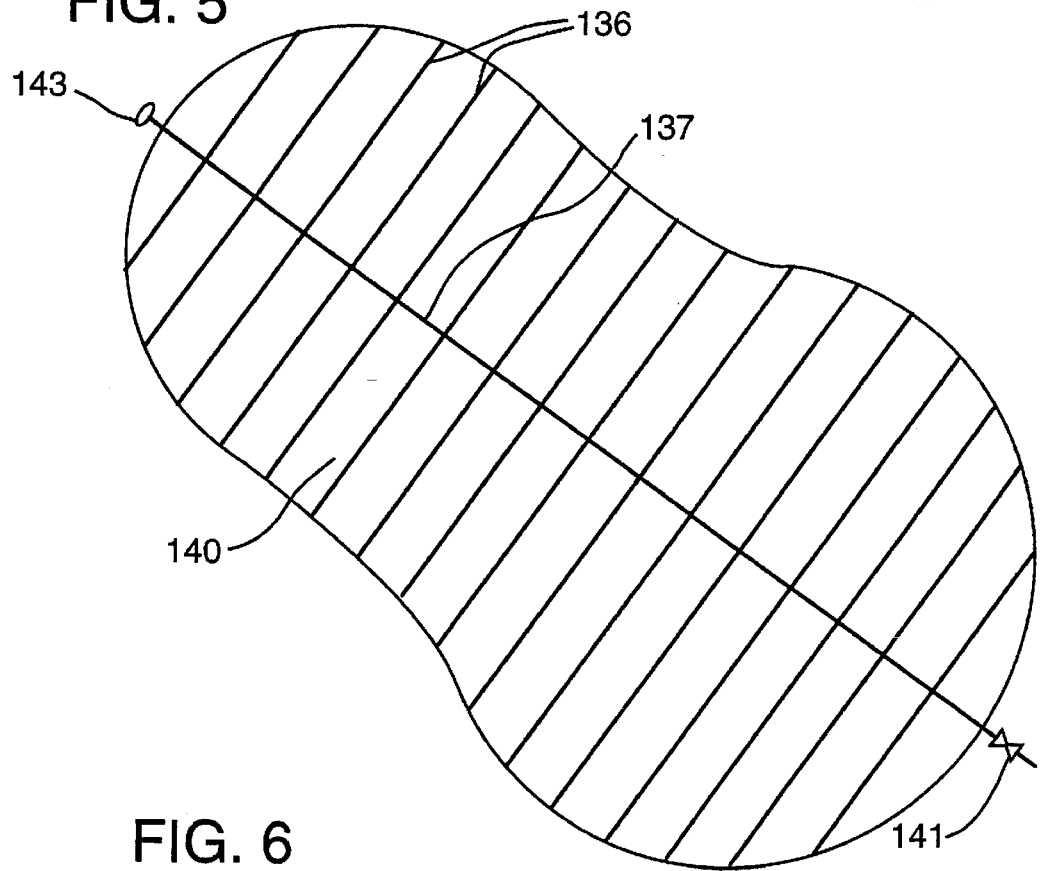
FIG. 6 is a schematic plan layout of the subterranean pipes shown in FIG. 5.

A layer of gravel 131 is placed above the base soil 112. The layer of gravel may be, for example, 2 inches (5 cm) in depth but preferably as close to the subgrade (112) as possible without being in the soil. A network of lateral pipes 136 is placed on top of the first layer of gravel 131 and connected to the longitudinal pipe 137. With reference to FIG. 6, there is shown a representation of a layout wherein the subterranean pipes are preferably configured with a longitudinal pipe 137 extending the length of the green in a longitudinal direction and a series of lateral pipes 136 extending from the longitudinal pipe 137 in a lateral direction to the outer edges of the green area 140. The longitudinal pipe 137 may, for example, be a four inch PVC pipe (class 200). The lateral pipes 136 may, for example, be three inch PVC pipes (class 160) and may, for example, be positioned approximately 4 feet center to center and extend the length of the golf green 140. The ends of the lateral pipes 136 are preferably capped.

Figure 7:
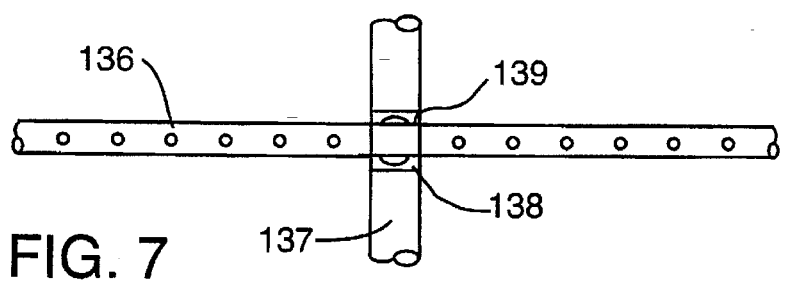
FIG. 7 shows a top sectional view of the connections of the subterranean pipes shown in FIG. 5.

With reference to FIG. 7, there is shown the details of one embodiment of an interconnection between the lateral pipes 136 and the longitudinal pipe 137. The longitudinal pipe 137 is placed in sections in the trough 114, with tee connections 139 spaced at intervals along the length thereof. The tee 139 is preferably a 4"×4"×3" tee, with the three inch opening facing upward. The lateral pipes 136 are then connected to the longitudinal pipe 137 using a 3"×3"×3" tee 138. Alternatively, the single network of subterranean pipes may be constructed using a single four-way connector such that the longitudinal pipe 137 lies substantially in the same horizontal plane as the lateral pipes 136. I prefer that holes 145 be spaced periodically along the length of the longitudinal pipe 137 and the lateral pipes 136 such as to provide a uniform distribution of air under pressure throughout the substratum. Such holes 145, may, for example, be one-half (½) inch in diameter and twelve inches center to center along the lateral pipes 136, and may be one-half (½) inch in diameter, twelve inches center to center along the longitudinal pipe 137. In both the longitudinal pipe 137 and the lateral pipes 136, I prefer that holes be positioned along the top and bottom of each pipe and along each side of each pipe. A four (4) inch gate valve 141 may be advantageously placed at a drainage end of the longitudinal pipe 137 for controlling the drainage of water contained within the substratum 110. A coupling 143, which may include a flow control valve, is provided for connecting a source of air (not shown) to the longitudinal pipe 137. The air may, for example, be air under pressure.

Referring again to FIG. 5, a second layer of gravel 133 is placed on top of the network of subterranean pipes. The second layer of gravel 133 is preferably six (6) inches in depth and sized similar to the first layer of gravel 131. As such, the combined layers of gravel 131, 133 preferably form a layer eight (8) inches in depth. A one (1) inch layer of smaller gravel 123 may then be placed upon the second layer of gravel 133. If used, the layer of smaller gravel 123 preferably comprises particles of gravel of a size comparable to shot gravel which may, for example, be sized between ¼" or three (3) and six (6) millimeters.

Completing the description of the substratum 110, there is a layer of sand or modified mix 126 placed above the layer of gravel 123. The layer of sand or modified mix 126 may, for example, be approximately one (1) foot to 15 inches in depth. The grass plants comprising the green area 140 are supported by the layer of sand 126.

Figure 8:
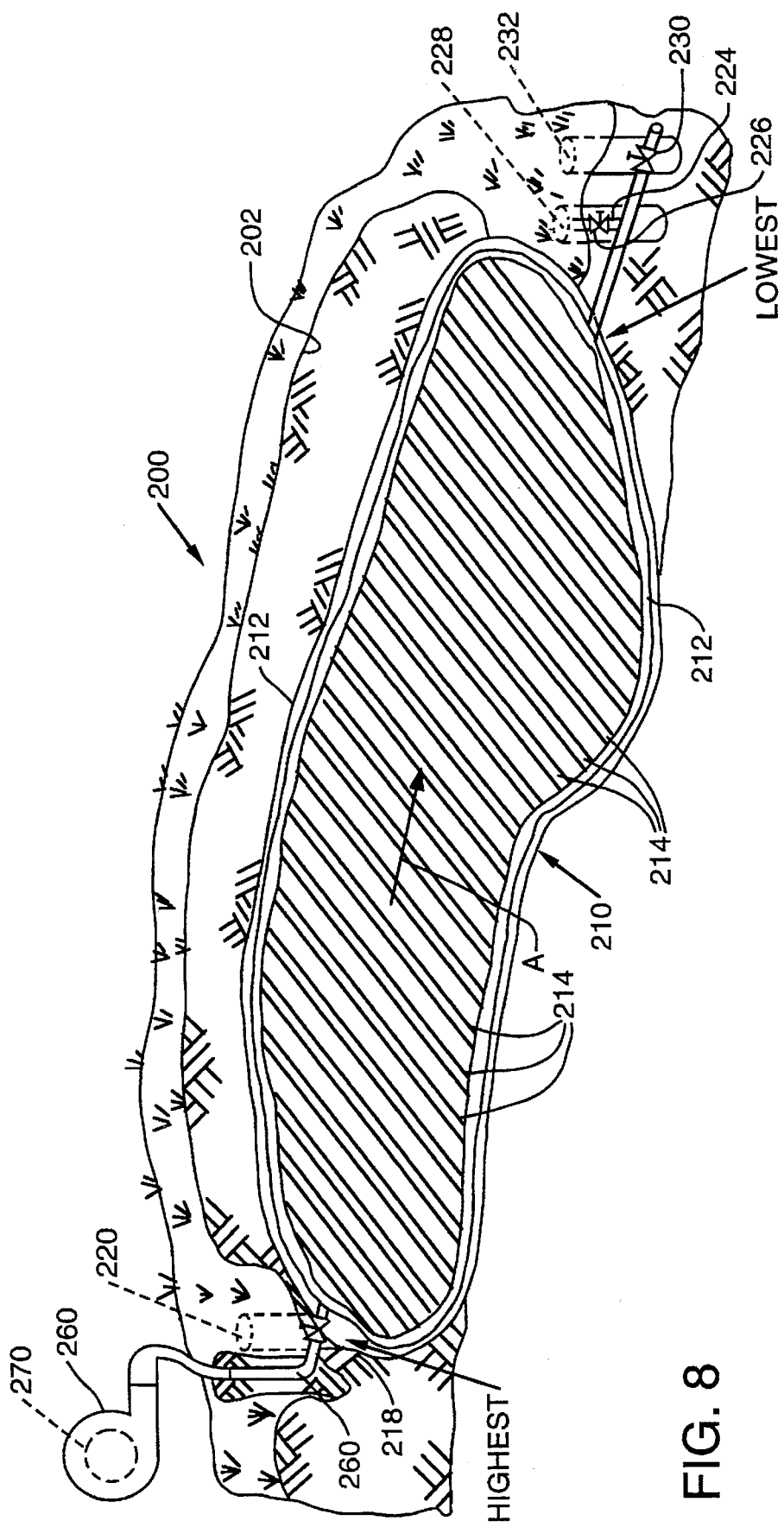
FIG. 8 is a partial plan view of a preferred piping network used to practice a preferred method of the present invention.
Figure 9:
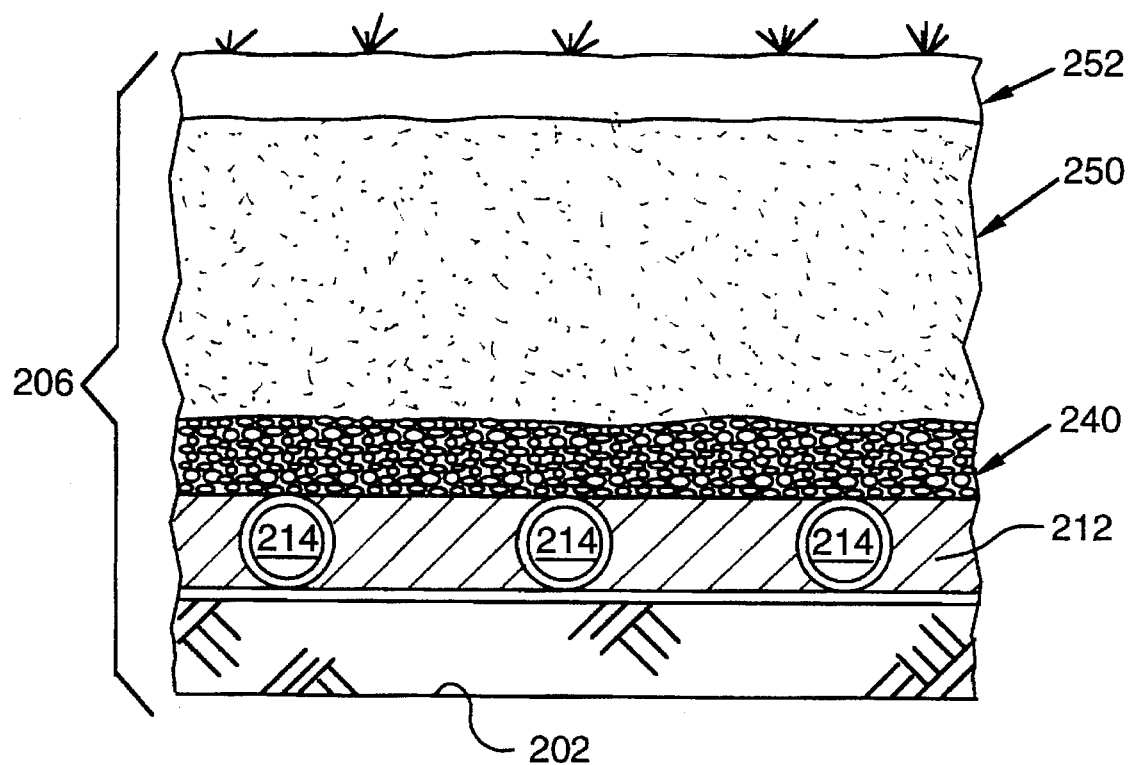
FIG. 9 is a cross-sectional view of a preferred substratum profile used to practice a preferred method of the subject invention.

Another profile arrangement for practicing a preferred method of the present invention is depicted in FIGS. 8 and 9. In this embodiment, construction begins by laying out the green 200 in a predetermined location. This area is then excavated, preferably to a depth of twenty inches (50 cm). This virgin soil excavation 202 should conform to a preferred contour of the green 200 and be compacted and evaluated for its ability to retain water using known techniques. Occasionally, a liner (not shown) must be added when the virgin soil is too porous. The highest and lowest portions of the excavated area are then determined using known methods. Thereafter, a network of pipes and valves, generally designated as 210, are installed in a preferred manner described below.

More specifically, as can be seen in FIG. 8, a circumferential pipe 212, preferably comprising a four inch non-perforated pipe fabricated from flexible polyvinyl chloride ("PVC") is positioned around the inside perimeter of the excavation 202. Cross pipes 214 are preferably laid at four foot intervals (1¼ m) perpendicular to the grade (designated by arrow "A" in FIG. 8) and are interconnected at each end to the non-perforated circumferential pipe 212. Cross pipes 214 preferably comprise commercially available four inch corrugated pipe that has ½" slits uniformly distributed therein. On the upper end of the excavation 202, a non-perforated first supply pipe 216 is attached to the circumferential pipe 214 and extends to the surface to provide access thereto. Preferably, the first supply pipe is fitted with a commercially available valve 218 as shown in FIG. 8. The skilled artisan will readily appreciate that the valve 218 is readily accessible by a passage, designated as 220, that extends to the surface. Also in a preferred embodiment, a second non-perforated drain pipe 222 is attached to the circumferential pipe 212 at the lower end of the grade. As can be seen in FIG. 8, a second non-perforated supply pipe 224 is preferably attached to the drain pipe 222 and is also preferably fitted with a commercially available shut off valve 226. It will be appreciated that shut off valve 226 can be accessed from the surface through a passageway, generally designated 228. In addition, a drain shut-off valve 230 is fitted in the drain pipe 222 on the down stream side of the second supply pipe 224. Shut-off valve 230 can be accessed from the surface through passage 232.

FIG. 9 depicts a side view of a preferred substratum profile, generally designated as 206. After the above-described piping network 210 has been assembled, preferably an eight inch (20 cm) layer of gravel 240 is laid over and between the pipes of the network 210. See FIG. 9. Preferably, gravel having a diameter of ¼"-½" (½-1 cm) is used. It will be appreciated that such layer of gravel 240 serves to prevent the green from settling without clogging the slits in the cross pipes 214. Also, as will be discussed in further detail below, such gravel layer 240 is course enough to permit air that is blown through the cross pipes 214 to flow uniformly through the profile 206. In addition, a thin layer (i.e., 1" thick) of ¼" diameter gravel (not shown) may be added to the top of the gravel layer 240.

In a preferred embodiment, a layer of modified sand 250 (i.e., sand mixed with natural soil or peat moss and nutrients), approximately 12"–14" deep is placed on the gravel layer. See FIG. 9. The skilled artisan will appreciate that such modified sand may, in some cases, contain up to 50% natural soil. Silica sand and/or silica or calcareous sand have been used in such mixtures. It will be understood that the grass mix is planted in the modified sand and the turf produced therefrom is designated as 252 in FIG. 9. Commercially available grass mixtures such as PennLinks, PennCross, 1020, and Providence have been successfully used.

As can be seen in FIG. 8, a commercially available blower or electrically powered air pump, generally designated as 260, is used to introduce air/oxygen into the substratum profile. In particular, the blower 260 is attached to the supply pipe 216 and the valve 218 is opened; the valves (226, 230) are closed. The blower 260 is then powered to supply air to the substratum profile 206 through the slits in the cross pipes 214 in a substantially uniform manner. If desired, the valve 226 may be opened and a second blower (not shown) may be attached to the second supply pipe 224 to increase the amount of air/oxygen supplied to the profile 206. If the blower 260 is operated while the valves 218 and 230 are open and valve 226 is closed, water in the pipes 212, 224 can be drained from the profile.

As shown in the following table, test results indicate that, when subjected to sufficient air/oxygen over a twenty-four hour period to fill the pour space available in their particular soil mixture, plants will experience as much as a 40% increase in root development over similar grass arrangements not receiving that amount of air/oxygen. One way the substratum pore space is calculated is by removing a sample of the profile having predetermined volume, heating the sample until it is dry, lightly compressing the sample using known techniques in a container until it is stable, adding water to the container until the sample is saturated, draining the water from the profile and measuring the volume of water so drained. For the purposes of that test, root development was determined by measuring the longest roots, as well as comparing the density of roots in each sample in (#/sq. in. or #/sq. cm). In a preferred embodiment, the air/oxygen is blown into the substratum 206 in the above-described manner to fill the pore space in the soil mixture at least once per day i.e., at the rate of 100% of available pore space. In another preferred embodiment, air/oxygen is supplied to the substratum 206 continuously such that the added air/oxygen fills at least 50% of the available pore space in the substratum 206 per (1) one hour period. As used herein, "continuously" means effectively operating 24 hours per day. It will be appreciated that, as long as there is water in the substratum 206, as much as ten times that amount of air/oxygen may be added (depending upon the amount of water actually present) without ill effect.

of air into the profile 206 causes the moisture to evaporate resulting in evaporative cooling of the profile 206. Under extensive tests with continuous air/oxygen injection as much as 5° F. (2° C.) cooling has been noted at the 6" (15 cm) root level. As can be seen in the following table, with daily air/oxygen injection at relatively high flow rates (i.e., 750 CFM or more) from a supply of cool air (i.e., air having a temperature of approximately 56° F.) and correct soil moisture levels (i.e., 50% of pore space), 1°–2° F. (½° C.) at the 6" level can be detected in as little as 10 minutes.

| Evaporative Cooling Results Temperature v. Air Blowing Time | | | | |
|---|---|---|---|---|
| Temperature (°F.) | 9:40 a.m. | 9:50 a.m. | 10:00 a.m. | 10:10 |
| Blower Discharge Temp. | 72 | 73 | 73 | 74 |
| Green Temperature at Outlet | 62.5 | 62 | 61.5 | 61 |
| Green Temperature at Inlet | 61 | 60 | 59.5 | 59 |
| Green Temperature at Middle | 60 | 59 | 58 | 57.5 |
| Green Surface Temperature | 56 | 57 | 57 | 58 |
| Outside Air Temperature | 55.5 | 56 | 57 | 58 |

The outside air temperature during the above-referenced test was about 56° F. (14° C.) and the relative humidity was approximately 30%. The temperature from the air blower 260 was 16° F. (9° C.) higher than the outside temperature due to the heat of compression. Temperature probes were placed in the following locations and (i) in the center of the green at a depth of 6 inches; (ii) in the supply pipe 216; (iii) in the drain pipe 222; and (iv) at the discharge of the blower 260. The airflow through the blower 260 during the test was

| | | | Percent of Root Growth Based on Amount of Pore Space Filed With Air/24 Hour Period v. Time Period | | | |
|---|---|---|---|---|---|---|
| Time Period | No Air | 100% | 200% (100% × 2) | 300% (100% × 3) | 500% (100% × 5) | 1000% (100% × 10) |
| 16 Weeks | 100% | 139% | 134% | 130% | 123% | 104% |
| 10 Weeks | 95% | 130% | 129% | 125% | 120% | 98% |
| 6 Weeks | 91% | 125% | 124% | 121% | 113% | 93% |
| 4 Weeks | 79% | 112% | 110% | 106% | 100% | 82% |
| 2 Weeks | 50% | 80% | 77% | 75% | 71% | 51% |
| 1 Week | 19% | 29% | 28% | 27% | 25% | 20% |
| 3 Days | 9% | 15% | 15% | 14% | 13% | 10% |

I have found that a 1000 CFM (30 CMM) leaf blower will fill a pore space in a 5000 sq. ft. (465 sq. m.) green in approximately five minutes. It has been determined that such leaf blower arrangement provides 390 pounds (175 Kg) of air or about 80 pounds (37 Kg) of oxygen to the substratum profile.

Other test results have shown that cooling of the soil profile 206 may also be achieved utilizing preferred methods of the present invention. Because the mass of injected air is small when compared to the mass of the soil profile 206, relatively little cooling of the profile 206 takes place. However, when moisture is in the profile 206, the addition maintained at approximately 750 CFM (20 CMM). As can be seen from the above table, a noticeable drop in temperatures across the green was experienced. If desired, an exterior air cooling means 270 in the form of an underground air source or other cooler may be attached to the intake of the blower 260 to achieve further cooling of the profile 206. Such exterior air cooling means preferably has the capability of pre-cooling the air to a preferred temperature of at or below the green ground temperature before it is blown into the profile 206.

It will be understood that variations and changes in the details of the substrata and the method for constructing the profile which have been herein described and illustrated to explain the present invention may be made by those skilled in the art without departing from the spirit, principle, and scope of the present invention. Accordingly, it is expressly intended that all such equivalents, variations and changes therefrom which fall within the principle and scope of the present invention as described herein and defined in the claims be embraced thereby.

What is claimed is:

1. A method for enhancing the growth of plants in a growing medium that covers a profile having a porosity, comprising the steps of:

coupling means for supplying air under pressure at a predetermined rate into said profile;

calculating the pore space of said profile;

calculating the time period necessary to inject air at said predetermined rate sufficient to fill the calculated pore space with air; and injecting air under pressure into said profile for at least said time period necessary to substantially fill said pore space of said profile with air.

2. The method of claim 1 wherein said means for supplying air under pressure comprises perforated pipe means beneath said profile.

3. The method of claim 2 wherein said air is continuously injected into said profile at a rate such that at least one half of said pore space of said profile is filled with said injected air during a one hour period.

4. The method of claim 3 further comprising the step of pre-cooling said air before injecting said air into said profile.

* * * * *